United States Patent [19]
Helding

[11] 4,005,135
[45] Jan. 25, 1977

[54] ROTATABLE ULTRAVIOLET LAMP REFLECTOR AND HEAT SINK

[75] Inventor: Norman A. Helding, Chicago, Ill.

[73] Assignee: Sun Chemical Corporation, New York, N.Y.

[22] Filed: Apr. 7, 1975

[21] Appl. No.: 565,601

[52] U.S. Cl. .................... 250/527; 34/1; 34/4; 240/47
[51] Int. Cl.² ............ B01K 1/00; F21V 29/00; F26B 3/28
[58] Field of Search ........... 204/158 R; 250/527; 34/1, 4; 21/DIG. 2, 102 R; 240/1 R, 9 A, 47

[56] References Cited
UNITED STATES PATENTS

| | | | |
|---|---|---|---|
| 3,152,764 | 10/1964 | Rice | 240/47 |
| 3,826,014 | 7/1974 | Helding | 34/1 |
| 3,894,343 | 7/1975 | Pray et al. | 34/4 |

Primary Examiner—Howard S. Williams
Attorney, Agent, or Firm—Cynthia Berlow

[57] ABSTRACT

Ultraviolet curing lamp systems consist of parallel-mounted, elongated ultraviolet lamps which are mounted within elongated reflectors. The reflectors have water-cooling conduits extending along their exterior surfaces, and further have flat, elongated shields extending over the top of the reflector housing. Cooling fluid is introduced into and removed from the cooling channels by coaxial water fittings at opposite corners of the reflector assembly, and the entire reflector assembly and lamp is rotatable about these water inlet and outlet fittings. The parallel assemblies are so disposed that they can illuminate a moving web or sheets of material having radiation curable substances thereon, and are rotatable to a shutter position in which the assemblies are rotated at 90° to their web-illuminating position so that the radiation from each lamp assembly falls on the water-cooled panel on top of an adjacent assembly. The lamp power is also reduced at the time the reflector assemblies are rotated to the rotated position in which ultraviolet energy is removed from the web region.

12 Claims, 11 Drawing Figures

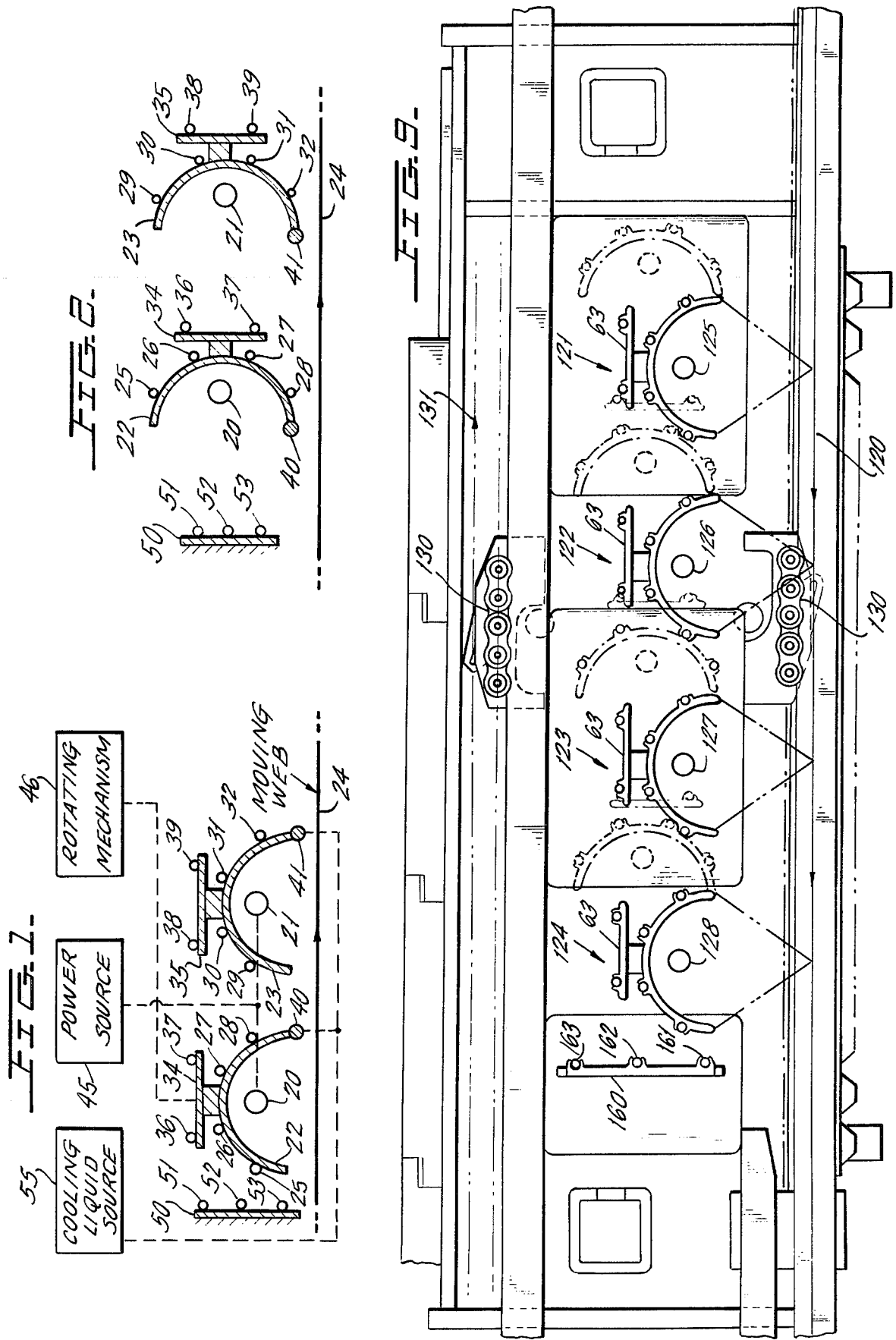

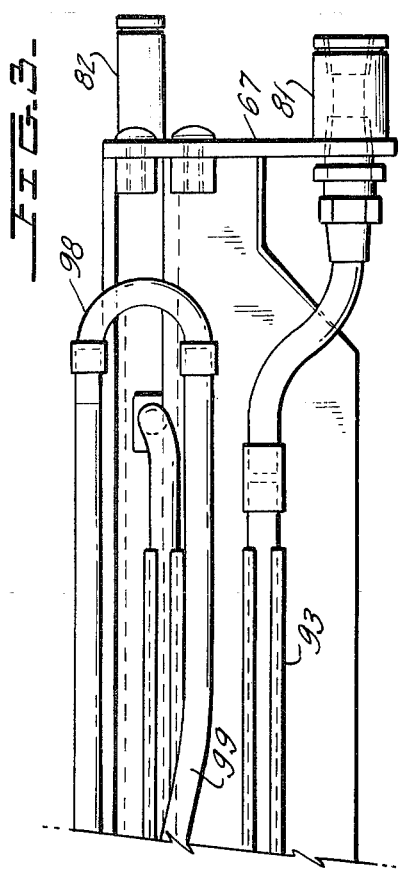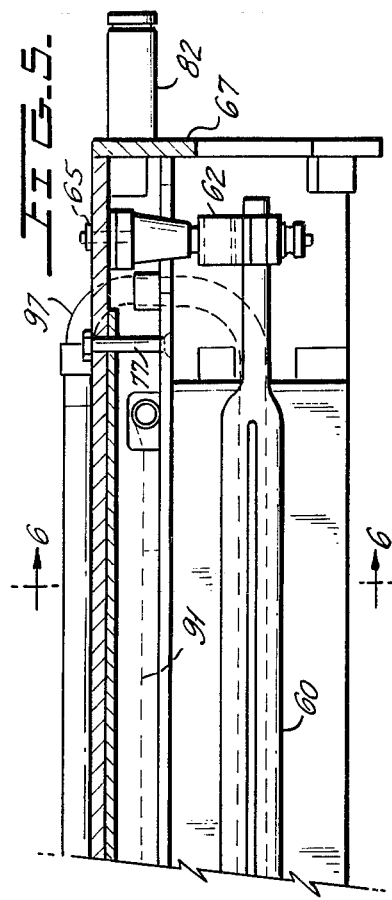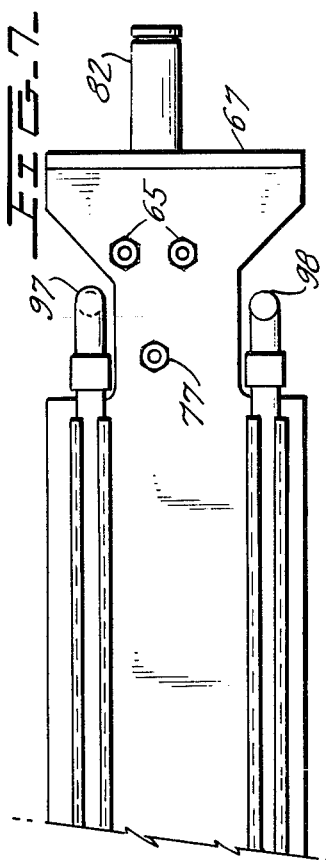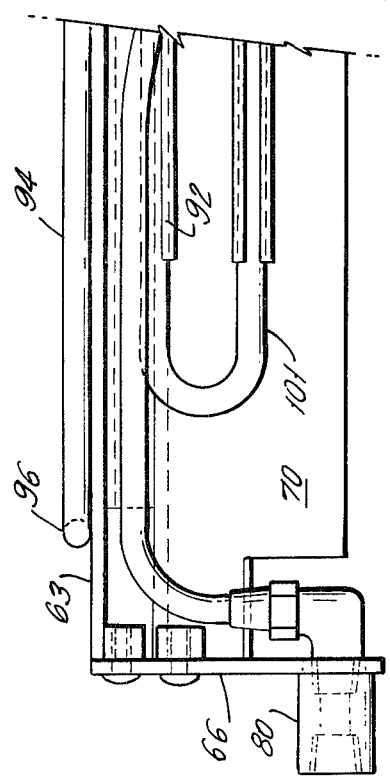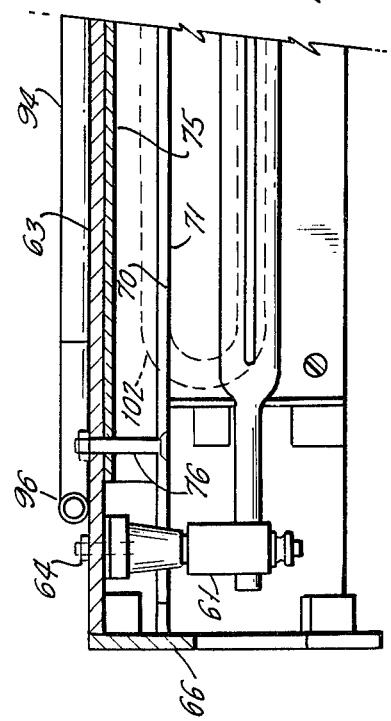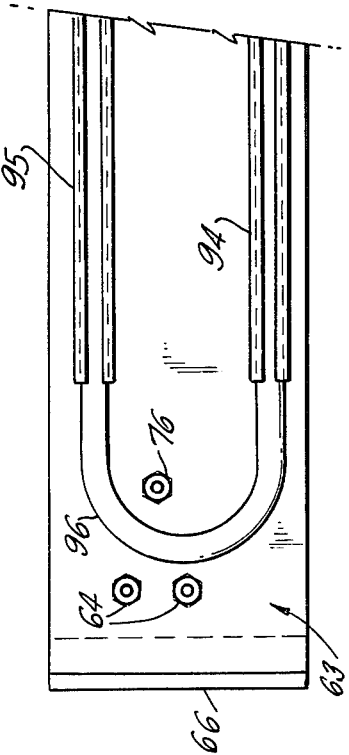

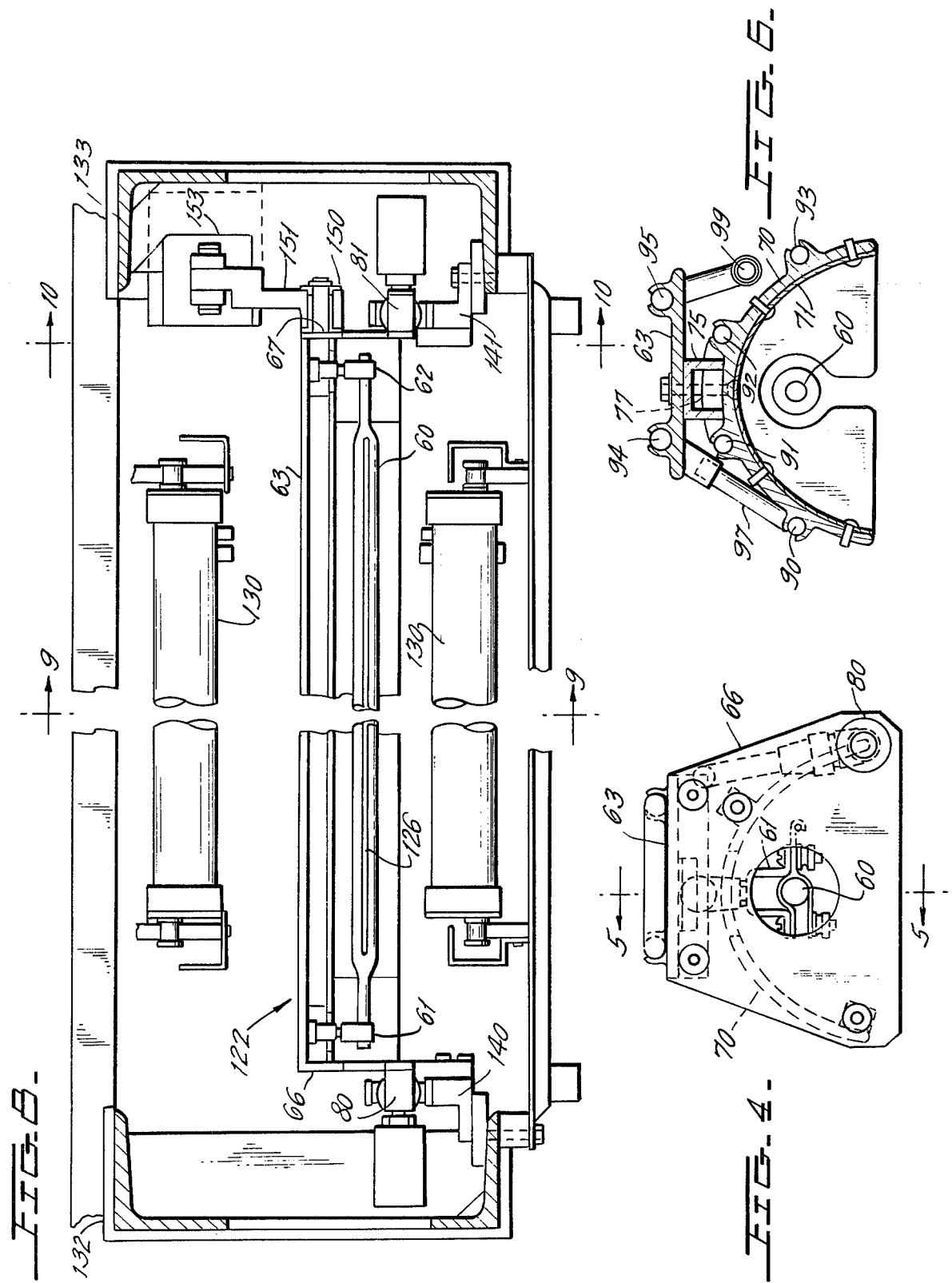

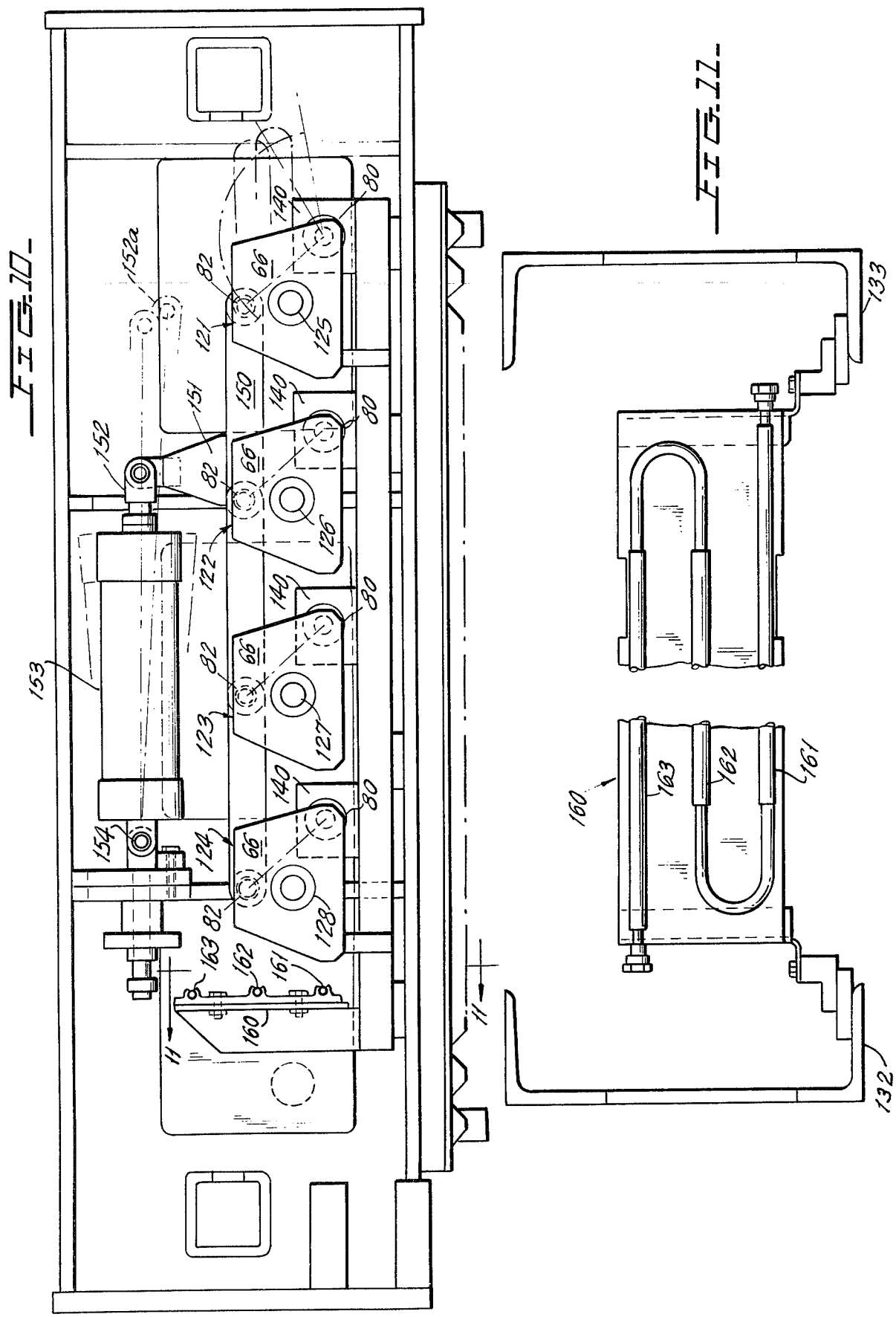

ROTATABLE ULTRAVIOLET LAMP REFLECTOR AND HEAT SINK

BACKGROUND OF THE INVENTION

This invention relates to a novel ultraviolet lamp curing assembly for the curing of radiation-sensitive materials such as ultraviolet curable inks, and more specifically relates to a novel multiple lamp arrangement which can be contained in a relatively small volume and which is relatively simple to manufacture.

Apparatus for producing ultraviolet radiation for the purpose of curing radiation-sensitive materials is well known. This kind of apparatus is described in U.S. Pat. Nos. 3,733,709 to Bassemir et al, 3,745,307 to Peek et al and 3,826,014 to Helding. Devices of this general category focus ultraviolet radiation on a moving web or moving sheet, and are generally provided with some type of shutter means to enable the easy redirection or blocking of ultraviolet radiation from the web without fully shutting off the ultraviolet lamps.

For example, it is necessary to remove ultraviolet radiation from the web if the web stops in order to prevent burning or other damage to the web or to the surrounding structural components of the device due to the intense heat produced by the ultraviolet lamps. It is, therefore, common practice to introduce movable shutters between the ultraviolet lamp and the web and to reduce the power to the lamps without turning them off during these intervals. Power to the lamps is usually not turned off since the lamps must remain off for a relatively long time before they can be reignited after shutdown.

Shutter structures which have been used in the past may be water-cooled radiation blocking and heat absorbing members which are laterally moved between the lamp and the web. Other arrangements are provided which use a clam-shell type of shutter arrangement around the ultraviolet lamp. Still other types of shutter configurations are known where the lamp reflector is simply rotated about the lamp axis, as in U.S. Pat. No. 3,829,982, where the lamp and its reflector are rotatably contained within a suitable shell.

Whenever the shutter components are designed with water-cooling conduits attached thereto to absorb the substantial amounts of heat produced by the lamps when the shutters are closed, a substantial amount of space is required for the shutter members. Moreover, relatively complex operating mechanisms have been needed to operate the shutters in the past and some difficulty has been experienced in applying the cooling liquid to the shutter structures since the shutters execute considerable movement.

BRIEF DESCRIPTION OF THE PRESENT INVENTION

In accordance with the present invention, a rotating heat sink is provided which carries the lamp and reflector as well as an external cooling panel disposed atop the exterior of the reflector housing, and the entire assemblage revolves around the axis of the fluid input and output couplings. The outer cooling panel then serves as a heat sink to the adjacent lamp when both assemblies are rotated to a closed-shutter position wherein the cooling panel of one lamp assembly receives the radiation of an adjacent lamp assembly and absorbs the heat energy produced by the adjacent lamp and its own lamp during the standby mode of operation. The heat sinks are made to be an integral part of the lamp assembly and the arrangement will require a reduced amount of space for the lamps as compared to arrangements using fixed heat sinks between lamps. Moreover, the arrangement permits the use of the same cooling fluid for the lamp reflector and heat sink, thereby substantially reducing the number of water connections necessary in the system.

BRIEF DESCRIPTION OF THE DRAWINGS

FIG. 1 schematically illustrates the present invention in a cross-sectional diagram and shows the lamps in operating position relative to a web beneath the lamps.

FIG. 2 is a schematic view of the equipment of FIG. 1 but shows the lamps rotated to their closed-shutter position, or standby mode of operation, so that the integral heat sink of one lamp faces an adjacent lamp assembly.

FIG. 3 is a plan view of a lamp and reflector assembly which is constructed in accordance with the features of the present invention.

FIG. 4 is an end view of the feed side of the lamp and reflector assembly of FIG. 3.

FIG. 5 is a cross-sectional view of FIG. 4 when taken across the section line 5—5 in FIG. 4.

FIG. 6 is a cross-sectional view of FIG. 5 taken across the section line 6—6 in FIG. 5.

FIG. 7 is a top plan view showing the cooling panel of the reflectors of FIGS. 3 to 6.

FIG. 8 is a cross-sectional view of a post-curing assembly containing a plurality of lamp assemblies which are each identical to those of FIGS. 3 to 7.

FIG. 9 is a cross-sectional view of FIG. 8 taken across the section line 9—9 in FIG. 8, and specifically illustrates four indentical lamp and reflector assemblies disposed parallel to one another.

FIG. 10 is a cross-sectional view of FIG. 8 taken across the section line 10—10 in FIG. 8.

FIG. 11 is a cross-sectional view of FIG. 10 taken across the section lines 11—11 in FIG. 10.

DETAILED DESCRIPTION OF THE DRAWINGS

Referring first to FIGS. 1 and 2, there is schematically illustrated two identical ultraviolet lamp and reflector assemblies where each of the assemblies includes elongated ultraviolet lamps 20 and 21, respectively, which are housed within elliptical or otherwise shaped reflectors 22 and 23, respectively. The lamps 20 and 21 and their reflectors 22 and 23 are so disposed that, when the reflectors are in the position of FIG. 1, the lamps will produce a focused line or band of radiation on a moving web or sheet 24 which moves beneath the lamps. Web 24 can, for example, be printed with an ultraviolet curable ink, which ink will cure upon its exposure to ultraviolet radiation. The moving web 24 can take any desired form and, for example, could consist of individually fed sheets of printed material or three-dimensional bulk objects which have been coated with or are to be secured together by ultraviolet curable materials.

Since the operation of the ultraviolet lamps produces considerable heat, it is desirable to cool the reflectors 22 and 23 and, by way of example, water-cooling conduits 25 to 28 can be fixed along the exterior of reflector 22. Similarly, conduits 29 and 32 can be fixed to the exterior of reflector 23.

In accordance with one set aspect of the present invention, heat sinks are formed on the exterior of reflectors 22 and 23 including integral heat sinks 34 and 35, respectively, which carry water-cooling conduits 36 and 37 for heat sink 34 and conduits 38 and 39 for the heat sink 35.

Each of the novel integral reflector and heat sink structures are then pivotally mounted along one edge of the reflector and are pivotally mounted at pivot 40 for reflector 22 and at pivot 41 for reflector 23. Thus, the reflector and lamp assemblies can be rotated from the position of FIG. 1 to the position of FIG. 2 about the pivots 40 and 41.

A suitable source of power 45 is connected to the lamps 20 and 21 for energizing the lamps so that, for example, the lamps can be energized at full power in the position of FIG. 1 and at reduced power in the position of FIG. 2.

A rotating mechanism 46 is also connected to the lamp assemblies as shown by dotted lines for rotating the assemblies to the position of FIG. 2. Rotating mechanism 46 is suitably connected to the power source 45 such that, when the lamp assembly can move to the position of FIG. 2, the lamp power from power source 45 is decreased.

When the lamps are rotated to the position of FIG. 2, it will be seen that the heat sink 34 is disposed adjacent the lamp assembly containing lamp 21 and thus receives and dissipates the heat which is produced by the lamp 21. Similarly, the heat sink 35 is rotated to a position where it will intercept the radiation and heat produced by a lamp which might be to the right of the lamp assembly including lamp 21.

If the lamp assembly including lamp 20 is the leftmost assembly of the system, then it will be placed adjacent a fixed heat sink 50 which may be water-cooled by water-cooling conduits 51, 52 and 53 where the heat sink 50 serves to block and absorb radiation and heat from the lamp 20 in the closed-shutter position of FIG. 2.

In accordance with an important aspect of the invention, the adjacent lamp assemblies rotate on pivots 40 and 41, and further, a cooling liquid source 55 is provided which has its input coupling and output coupling connected on the axis of pivots 40 and 41. Moreover, suitable interconnections between the various water-cooling conduits (not shown) place all of the conduits in each assembly in given series and/or series parallel arrangements, with the number of couplings being reduced to a minimum in the system.

FIGS. 3 to 7 illustrate one embodiment of a combined reflector and heat sink which carries out the concepts shown in FIGS. 1 and 2. Referring now to FIGS. 3 to 7, there is illustrated a rotatable support assembly for an ultraviolet light arc lamp 60 which is supported from and electrically connected to suitable lamp electrodes 61 and 62 (FIG. 5) and the lamp electrodes are supported from an upper cooling panel or plate 63 by suitable nuts and bolts including nuts 64 and 65, respectively.

The upper cooling panel 63 which corresponds to integral heat sinks 34 and 35 of FIGS. 1 and 2 is then suitably bolted to support end plates 66 and 67 as by bolting or the like, and the plates 66 and 67 further receive a generally elliptically shaped reflector housing 70. The lamp reflector housing 70 then supports a reflector insert 71 which is preferably of a material which is highly reflective to ultraviolet radiation and which extends essentially for the full length of the lamp 60 which may, for example, be about 65 inches. Suitable end reflectors are also placed adjacent the ends of the lamps to block radiation from the lamp terminals.

The reflector 71 is illustrated best in FIG. 6 as being held to the interior of its housing 70 by suitable screws. The reflector housing 70 and upper cooling panel 63 are then rigidly connected to one another by the U-shaped channel 75 to define, in essence, a rigid integral housing. Channel 75 is bolted between housing 70 and panel 63 by bolts, such as bolts 76 and 77 although these components could have been welded together if desired and welded to the end plates 66 and 67.

The end plates 66 and 67 then receive water-connection fittings 80 and 81 best shown in FIGS. 3 and 4 where the fittings 80 and 81 are generally disposed coaxially with one another and in alignment with the right-hand edge of reflector housing 70. As will be described later, the connection fittings 80 and 81 serve as the pivot points for rotating the assembly shown in FIGS. 3 to 7. The end plate 65 is further provided with an integrally extending operating shaft 82 (FIGS. 3, 5 and 7).

A plurality of elongated water-cooling conduits is then provided in intimate engagement with reflector housing 70 and upper cooling panel 63, and consist of elongated conduits 90 to 93 for housing 70 and conduits 94 and 95 cooling panel 63.

The left-hand end of conduits 94 and 95, as shown in FIG. 7, are connected together by a U-shaped coupling tube 96, and the right-hand end of conduits 94 and 95 receive U-shaped coupling tubes 97 and 98, respectively, which are in turn connected to conduit 90 (FIG. 6) and to the inlet conduit 99 which is directly connected to the inlet coupling 80 as shown in FIGS. 3 and 6.

Conduit 93, as shown in FIG. 3, is connected to outlet coupling 81 and is provided with a U-shaped coupling 101 which connects it to conduit 92 and the right-hand end of conduit 92 is connected to the right-hand end of conduit 91. The conduit 91 is, in turn, connected to the conduit 90 by the coupling tube 102 shown in dotted lines in FIG. 5. Thus, the fluid path from coupling 80 to coupling 81 will include the series connection of conduit 99, conduit 95, conduit 94, conduit 90, conduit 92 and conduit 93. Note that, when the assembly rotates on its couplings 80 and 81, the fluid path is unaffected and all of the conduits of the cooling system rotate as a rigid unit.

It will be noted that other connection schemes could be used where all interconnections between water-cooling conduits takes place within the assembly with the conduits being variously in series and in parallel with one another.

FIGS. 8 to 11 show a plurality of lamp and reflector assemblies of the type shown in FIGS. 3 to 7 as assembled into a post-curing system which can be mounted in an extended delivery section of a conventional printing press to cause substantially instantaneous curing of standard wet trap printing or to cause additional curing of multi-color printed material coming from a press with interstation drying units.

The curing unit of FIGS. 8 to 11 contains means for passing a paper web or a series of sheets 120 from right to left in FIG. 9 beneath four indentical lamp reflector assemblies 121, 122, 123 and 124. The solid line position of FIG. 9 shows the lamps in their operating position at which position the ultraviolet light of the lamps 125 to 128 is focused on the web 120. Note that conventional gripper bar structures 130 (FIGS. 8 and 9)

are provided for moving the web or sheets through the heating zone, with the gripper bars taking a gripper bar return path shown by the arrow 131 which is above the lamp assemblies. Note further that the entire post-curing unit is supported between suitably supported frame members 132 and 133 (FIGS. 8 and 11).

Each of the assemblies 121 to 124 have coupling input and output fittings 80 and 81 which are pivotally mounted in suitable stationary support bearings 140 and 141, respectively.

FIGS. 8 and 11 also show the end plates 66 and 67 for each of the lamp assemblies 121 to 124, respectively, and it will be noted particularly in FIG. 10 that a common operating bar 150 is connected to operating levers 82 of each of the assemblies 121 to 124. The operating bar 150 is then provided with a projecting ear 151 which is pivotally connected to the output link 152 of an operating cylinder 153. The cylinder 153 is then pivotally mounted at pivot 154, whereby the operation of cylinder 153 will cause its plunger 152 to move to the phantom position 152a of FIG. 10, thereby rotating each of the operating members 82 about the axis defined by the axis of their respective couplings 80 to rotate the assemblies 121 to 124 to the phantom positions shown in FIG. 9. This will then cause the radiation and heat of each of the lamps to be focused onto the heat sink 63 of the adjacent lamp assembly.

It will be noted that the assembly 124 does not have a further assembly to the left thereof, so that a heat sink 160 (FIGS. 9, 10 and 11) is stationarily mounted in place and is provided with suitable water-cooling conduits 161, 162 and 163 for carrying away the heat produced by the lamp 128 of assembly 124 when assembly 124 is rotated to the standby position shown in phantom lines in FIG. 9.

Although this invention has been described with respect to its preferred embodiments, it should be understood that many variations and modifications will now be obvious to those skilled in the art, and it is preferred, therefore, that the scope of this invention be limited not by the specific disclosure herein but only by the appended claims.

The embodiments of the invention is which an exclusive privilege or property is claimed are defined as follows:

1. Apparatus for curing photopolymerizable materials which are moved in a plane, comprising a plurality of spaced parallel disposed lamp and reflector assemblies which are elongated along lines parallel to said plane and generally perpendicular to the direction of movement of said photopolymerizable materials; each of said lamp and reflector assemblies consisting of an elongated lamp disposed within an elongated reflector which is generally curved partially around said lamp and which terminates on two parallel-extending edges which are parallel to said lamp, whereby said generally curved reflector focuses the radiation of said lamp beyond said two parallel-extending edges of said reflector and toward objects which face said lamp; means for rotatably mounting each of said lamp and reflector assemblies comprising pivotal mounting means which is generally coaxial with corresponding ones of said two parallel-extending edges of each of said reflectors; and means for simultaneously rotating each of said lamp and reflector assemblies between a first position at which the radiation of said lamps is directed toward said plane to a second position at which the radiation of at least one of said lamps is directed toward the rear surface of the reflector of an adjacent lamp and reflector assembly.

2. The apparatus of claim 1 which further includes a source of power for said lamps and means connecting said source of power to said means for rotating said assemblies for reducing the power to said lamps when said assemblies are moved to their said second position.

3. The apparatus of claim 1 wherein said photopolymerizable material is printing ink and said lamps are ultraviolet lamps.

4. The apparatus of claim 1 which further includes flat elongated heat sink plates mechanically secured to and thermally connected to and being generally coextensive with the rear surface of each of said reflectors; the radiation of each of said lamps being directed toward said plates of an adjacent reflector when said assemblies are rotated to their said second position.

5. The apparatus of claim 4 which further includes a plurality of elongated cooling fluid conduits secured to the surface of each of said heat sink plates which is disposed away from its respective reflector, and extending generally parallel to the direction of said lamp; said plurality of conduits for each of said reflectors being interconnected between an input fluid fitting and an output fluid fitting; said input fluid fitting and said output fluid fitting of said reflectors being disposed at opposite respective ends of said reflectors and being coaxial with the axis of rotation of their respective reflector.

6. The apparatus of claim 1 which further includes a plurality of elongated cooling fluid conduits secured to the rear surface of each of said reflectors and extending generally parallel to the direction of said lamps; said plurality of conduits for each of said reflectors being interconnected between an input fluid fitting and an output fluid fitting; said input fluid fitting and said output fluid fitting of said reflectors being disposed at opposite respective ends of said reflectors and being coaxial with the axis of rotation of their respective reflector.

7. The apparatus of claim 6 which further includes a fixed heat sink plate disposed adjacent the open end of the reflector of the first of the plurality of lamp and reflector assemblies, whereby the radiation of said lamp of said first assembly is directed toward said fixed heat sink plate when said assemblies are moved to their second position.

8. The apparatus of claim 7 which further includes flat elongated heat sink plates mechanically secured to and thermally connected to and being generally coextensive with the rear surface of each of said reflectors; the radiation of each of said lamps being directed toward said plates of an adjacent reflector when said assemblies are rotated to their said second position.

9. The apparatus of claim 6 which further includes flat elongated heat sink plates mechanically secured to and thermally connected to and being generally coextensive with the rear surface of each of said reflectors; the radiation of each of said lamps being directed toward said plates of an adjacent reflector when said assemblies are rotated to their said second position.

10. The apparatus of claim 9 which further includes a second plurality of elongated cooling fluid conduits secured to the surface of each of said heat sink plates which is disposed away from its respective reflector and extending generally parallel to the direction of said lamp; said second plurality of conduits being interconnected with said plurality of conduits between said input and output fluid fittings.

11. The apparatus of claim 10 which further includes a fixed heat sink plate disposed adjacent the open end of the reflector of the first of the plurality of lamp and reflector assemblies, whereby the radiation of said lamp of said first assembly is directed toward said fixed heat sink plate when said assemblies are moved to their said second position.

12. The apparatus of claim 11 which further includes a source of power for said lamps and means connecting said source of power to said means for rotating said assemblies for reducing the power to said lamps when said assemblies are moved to their said second position.

* * * * *